United States Patent [19]

Keller

[11] Patent Number: 4,860,587

[45] Date of Patent: Aug. 29, 1989

[54] STRESS GAUGE

[76] Inventor: Carl E. Keller, P.O. Box 8413, Santa Fe, N. Mex. 87504

[21] Appl. No.: 200,419

[22] Filed: May 31, 1988

[51] Int. Cl.[4] .............................................. G01N 1/18
[52] U.S. Cl. ........................................ 73/774; 73/784
[58] Field of Search .................. 73/784, 774, 763, 773

[56] References Cited

U.S. PATENT DOCUMENTS 4,377,185 3/1983 Katz .................................. 73/49.6 X
4,542,655 9/1985 Park et al. ............................. 73/784

Primary Examiner—Tom Noland

[57] ABSTRACT

This invention is a stress gauge whose components include a piezoresistive sensor embedded in epoxy, a flatjack, and a housing for the sensor and flatjack. The preferred piezoresistive sensor is ytterbium because of its sensitivity to pressures in the range of interest. This arrangement allows the gauge sensing element to be calibrated at the place of measurement. That calibration is provided by a well controlled uniaxial load applied to the gauge to test the gauge response. Upon removal of the applied load, the gauge can continue to measure the stress history of the surrounding medium.

2 Claims, 4 Drawing Sheets

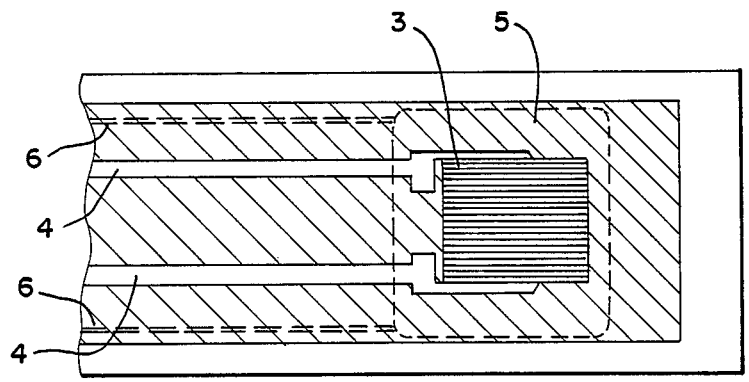
FIG. IA
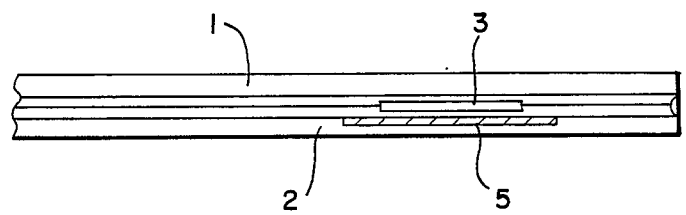
FIG. IB

NUCLEAR SHOCK WAVE MEASUREMENT

STRESS HISTORY IN DAM STRUCTURE

STRESS GAUGE

FIELD OF THE INVENTION

This invention relates generally to the field of gauges.

DESCRIPTION OF RELATED ART

The art may be described as follows:
Past stress measurements near explosives have been based upon the best effort with the techniques available. But the success ratio has been very small for the following:

1. There was no facility for validation of a gauge in a known divergent stress field.
2. Most gauge development has been driven by a scheduled application which seriously limited the use of new techniques.
3. Recent experimental results show that past measurements are suspect because of the strain of piezo resistive gauge elements or the effect of the surrounding materials (e.g. grout, gauge structure or even the geologic medium), "the inclusion effect".
4. Gauges failed because of damage to the transducer, the cabling or signal processing equipment, or due to electro magnetic phenomenon.

The remote measurement of stress (e.g. deep borehole fluid pressure, material pressures in underground mines, shock histories near underground explosions) is often complicated by changes of the stress gauge during the period of interest. Such changes are due to mechanical damage (strain), temperature effects, corrosion, or electronic drift of the instrument.

An object of this invention is to allow the gauge sensing element to be calibrated in the place of measurement. That calibration is provided by a well controlled uniaxial load application to the gauge to test the gauge response. Upon removal of the applied load, the gauge can continue to measure the stress history of the surrounding medium.

Other objects will be appreciated from the following description of the invention.

SUMMARY OF THE INVENTION

The basic gauge is a layered composite of a metal strip, a flatjack, a stress sensitive element and another metal strap. The edges of the metal straps are sealed by a weld or other fastenings. The metal straps limit the load on the sensing element to a uniaxial load. The stress gauge measures a stress history via the electrical response of the sensing element. The flatjack can be pressurized with a fluid capillary tube to apply a uniaxial load to the sensing element. This fluid allows one to test the gauge function. It also allows the measurement of the external stress on the gauge body at the time the flatjack is pressurized. The detailed description of the gauge function will explain how the external stress is measured.

BRIEF DESCRIPTION OF THE DRAWING

The invention may be more readily understood by reference to the drawings wherein FIG. 1A is a view in cross section of the gauge with top housing and top insulation removed. FIG. 1B is a view in cross section through the center line of the gauge. FIG. 2A is a plan view in cross section of the flatjack. FIG. 2b is a section of the lines XX of FIG. 2a.

PREFERRED EMBODIMENT OF THE INVENTION

Figures 2A, 2B:
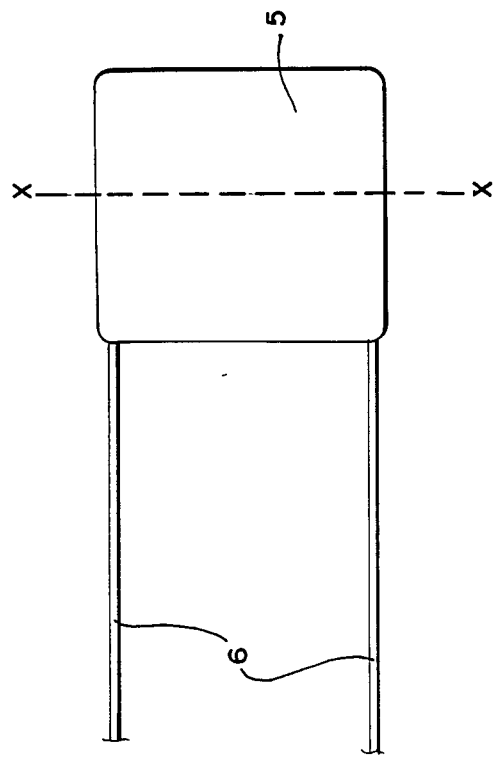

The invention may be more readily understood by referring in greater detail to earlier Figures of the drawings.

The stress history on the gauge is measured as follows: The stress component perpendicular to the metal strap (1), (2), is transmitted to the sensitive layer (3) (ytterbium, manganin, carbon, etc...) causing a change in resistance. The change in electrical resistance is measured via the electrical leads (4). The stress is determined via a gauge calibration curve.

When a calibration of the sensitive layer is desired, the flatjack (5) is pressurized via the one hydraulic line (6) (either of the two lines) and the pressure is measured in the other line. The flatjack pressure lies between the pressure of the inlet line and the pressure of the outlet line. When the inlet and outlet pressures are allowed to equilibrate, the flatjack pressure is known precisely. The resistance value of the sensing element (3) is measured. The flatjack pressure is increased a small amount and the resistance of the sensing element (3) is measured again.

Figure 3:
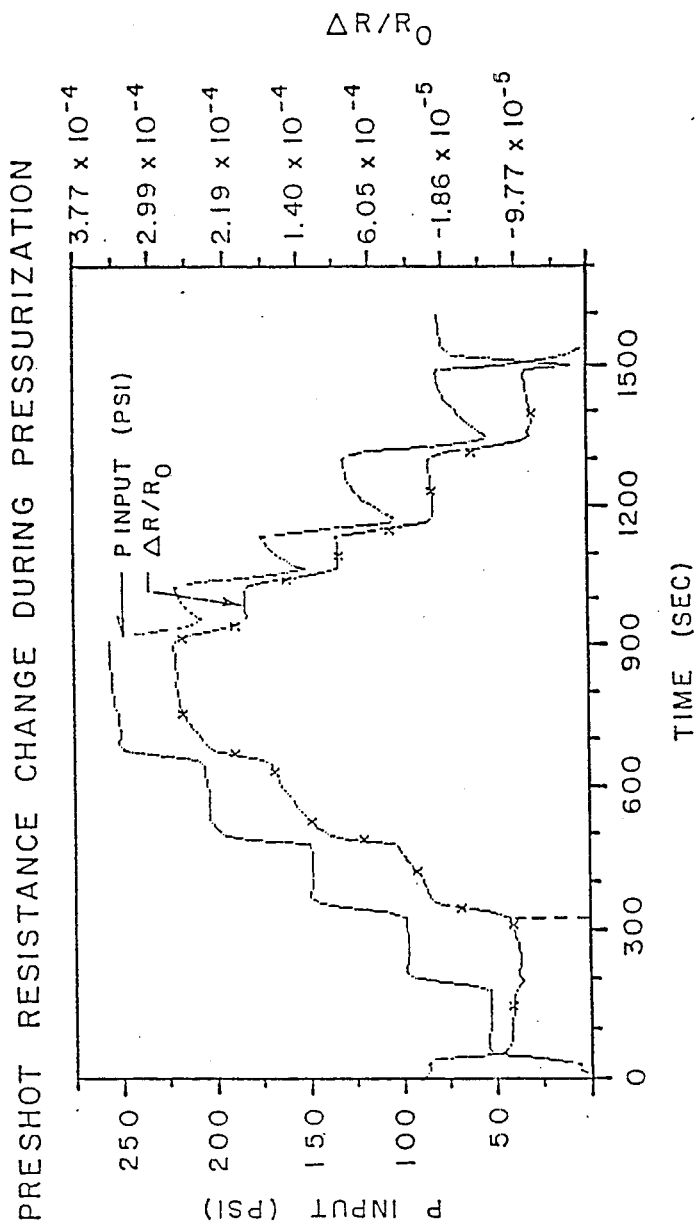
FIG. 3 is a Graph.
Figure 4:
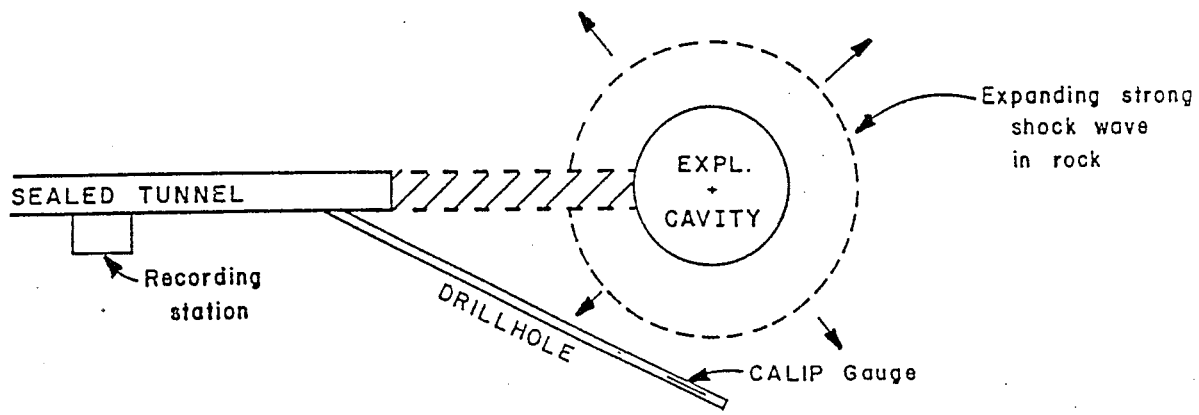
FIG. 4 is a schematic view of nuclear shock wave measurement.
Figure 5:
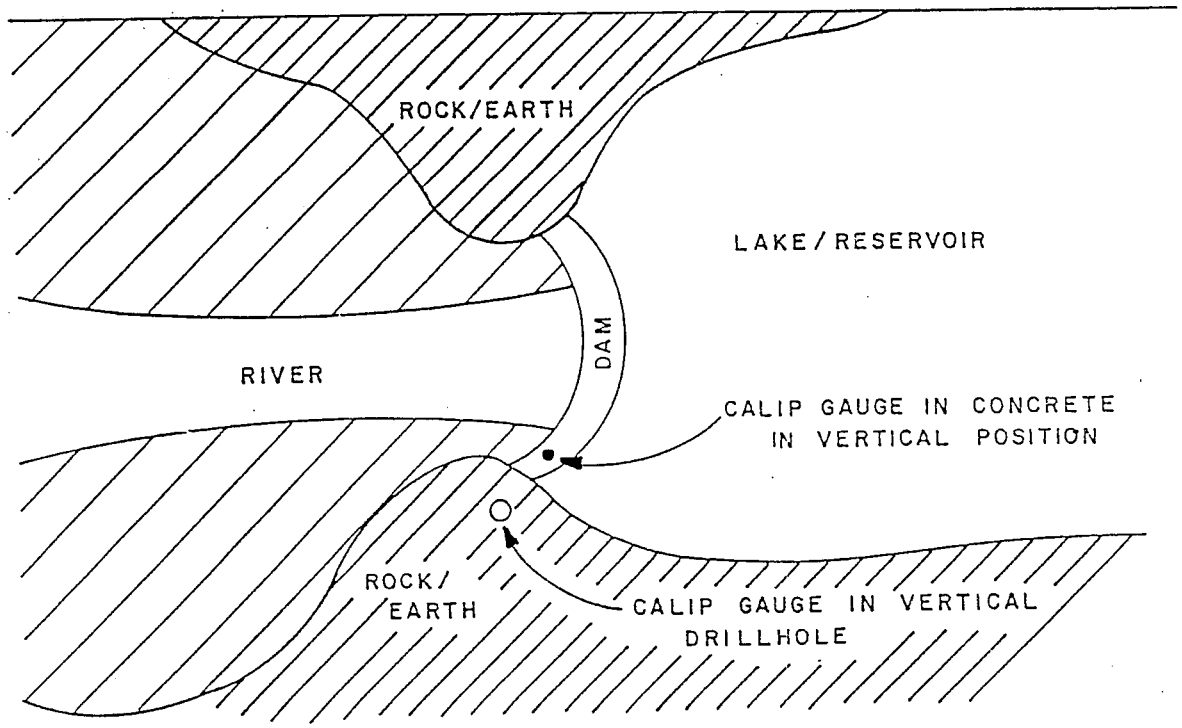
FIG. 5 shows stress history in dam structure.

The pressurization of the flatjack (5) dilates the thin space within the flatjack and applies a uniform hydraulic pressure (a uniaxial stress load) to the sensing element (3). Since there is no mechanically significant difference between the load of the metal strap (1) on the sensing element and the load of the flatjack (5) on the element, the gauge can be calibrated by the correlation of the resistance change to the pressure applied. FIG. 3 is a plot of the pressurization sequence and the resistance change (actual test data).

The second benefit of the gauge design, independent stress measurement, is derived as follows: Given an existing stress on the gauge of magnitude A and a resistance value of R, one can use a calibration curve to determine the value of A from R when R is different from the original resistance $R_o$. However, $R=R-R_o$ may not be entirely due to the stress A. It may be partly due to a temperature change $\Delta T$. Or, $\Delta R = R_T + R_S$ where $\Delta R_T$ is the temperature effect and $\Delta R_S$ is the stress effect.

It is important, and useful, that the pressure applied to the flatjack will not inflate the flatjack until the pressure exceeds the value A. It has been shown that when the pressure in the fluid lines exceeds A, the resistance R changes because of the increased load on the sensing element. At that point of change, the pressure is equal to the stress component A perpendicular to the metal plate. If the pressure of magnitude A does not correspond to an expected resistance change R, the difference, $\Delta R_T$, is not due to stress but due to the temperature or some other effect. In this way, one can correct the calibration curve used by the value of $\Delta R_T$. By a stepwise increase of pressure in the flatjack above P=A, a new calibration curve is obtained.

Hence, one can measure the stress value A on the gauge at any time. One can correct the calibration curve for the gauge, and use the gauge sensing element resistance to follow the stress history between calibration times.

It is important that one not greatly exceed the confining stress during calibration or the flatjack will balloon to a "nonuniaxial shape." There are also obvious limitations on calibration frequency such as fluid velocities in the pressure tubes. Both gas and liquid fluids have been used.

The gauge without the flatjack is called a flatpack. The addition of the flatjack allows a much greater range of applications and increases the gauge accuracy.

The use and function of the gauge may be more readily understood by referring to the following examples:

EXAMPLE 1

The original application of the stress gauge was to measure the stress history in the rock near a nuclear explosion. The gauge is emplaced in a horizontal drill hole. The hole is then filled with a cement grout and the electrical cable and capillary tubing is extended to a recording station. Upon explosion of the nuclear device, an extremely strong shock wave travels through the rock away from the explosion center. As the shock wave passes over the drill hole, it compresses the stress gauge producing a change in the sensing element resistance proportional to the magnitude of the stress of the shock wave.

After shock passage, the sensing element often has a residual/permanent resistance change. By pressurization of the flatjack, the magnitude of the actual residual stress on the gauge is measured. Comparison of that stress value with the stress inferred from the residual resistance change determines how much of the resistance is due to stress and how much is due to some other affect of the shock on the gauge (e.g., binding of the gauge). Then a stepwise increase of the flatjack pressure and a measurement of the associated resistance changes in the sensing element gives one a new calibration curve for the gauge. Comparison with the calibration curve measured before the explosion provides good insight into the state of the gauge. Such insight is necessary to obtain confidence in the shock wave stress history (e.g., did d the gauge calibration/sensitivity change during the shock wave measurement?) It is also possible to reuse the gauge for another shock wave measurement from another nearby explosion.

The explosion source could also be a conventional chemical explosion such as TNT. The gauge function is the same.

EXAMPLE 2

Another use of the gauge is to measure a stress history over a long time period (e.g. years). An example would be the abatement stress of a dam against supporting canyon walls. The stress gauge could be cast into the concrete dam and also emplaced in a vertical hole in the rock adjacent to the dam. During the rise of water in the pond, the dam and the rock suffer an increasing compressive stress state to resist the water load. That increasing stress would compress the sensing element in the stress gauge producing a history of resistance change recorded via the electrical cable. The water buildup behind the dam could also cause a temperature change in the dam and in the gauge. That temperature change will also produce a change in the resistance of the sensing element. In order to determine what part of the resistance change is due to temperature and what part is due to a stress change, the same calibration procedure can be performed and the stress measured via flatjack pressure. In that way, the resistance change due to a temperature change is inferred and the stress history can be corrected. As time passes, other nonstress effects on the sensing element may occur (e.g., corrosion). A recalibration can be performed to determine the true stress on the gauge at the time of calibration. In this way, any changes in the resistance can be well separated into that due to stress and that due to other things. Hence, the stress history deep in the concrete or deep in the drill hole is accurately determined. This same approach is possible for reliable stress history measurements ranging from tectonic stress buildup near earthquake faults to foundation loads for many kinds of structures.

This invention has many advantages. One of which is to allow the measurement of stress history with better than millisecond time resolution for periods of years. The ability to recalibrate the gauge, in place, at will, removes the effect of most gauge perturbations due to causes other than stress changes.

The gauge is connected to the appropriate recording equipment via an electrical cable and two capillary tubes. The gauge simplicity is a major advantage. It does not depend upon any moving parts, levers, beams, strain gauges, vibrating fluid columns or other complexities for its function.

An advantage of this design is that it can function under extreme temperatures and temperature variations. There are no moving parts to deform due to heat or cold, and the thermal effects on the sensing element are treated by the recalibration process.

This design can be scaled up or down as needed for particular applications (e.g., 1 gm high explosive scaled model tests to 10 kilotin nuclear explosions).

An advantage of this invention is that the failure of the gauge can be certified, under many circumstances, by the recalibration results. Hence the hazard of erroneous data is reduced.

It is expected that the durability, accuracy and simple geometry of this gauge will allow for its use for in situ stress measurements in an extremely wide range of circumstances (e.g., monitoring stress changes near earthquake fault zones, near explosions, near mine workings, building foundations and under road beds).

Since many variations can be made without departing from the scope of the invention, I intend to be bound only by the following patent claims:

I claim:
1. An electrical stress gauge comprising:
   a. a stress sensor material which generates a voltage proportional to applied stress;
   b. electrical insulating means surrounding said sensor;
   c. a closed housing surrounding said sensor and insulating means;
   d. a flat jack positioned with said housing and overlying said sensor in closely spaced parallel relation, thereto,
   e. conduit means extending through said housing and affording connection of a source of pressurized fluid to said flat jack for uniaxial loading of said sensor; and
   f. conductive means extending through said housing affording electrical connection to said sensor.
2. A stress gauge as defined by claim 1 in which said housing permits only a uniaxial load on said sensor.

* * * * *